US009258986B2

(12) United States Patent
Walsh et al.

(10) Patent No.: US 9,258,986 B2
(45) Date of Patent: Feb. 16, 2016

(54) CHAMBERED LEADER LURE

(75) Inventors: Christopher Walsh, Tamarac, FL (US); David Justice, Tamarac, FL (US)

(73) Assignee: Justice Tackle & Co., LLC, Tamarac, FL (US)

( * ) Notice: Subject to any disclaimer, the term of this patent is extended or adjusted under 35 U.S.C. 154(b) by 679 days.

(21) Appl. No.: 13/296,470

(22) Filed: Nov. 15, 2011

(65) Prior Publication Data
US 2012/0137568 A1 Jun. 7, 2012

Related U.S. Application Data

(60) Provisional application No. 61/416,158, filed on Nov. 22, 2010.

(51) Int. Cl.
*A01K 85/00* (2006.01)
*A01K 85/16* (2006.01)
*A01K 85/02* (2006.01)

(52) U.S. Cl.
CPC ................ *A01K 85/16* (2013.01); *A01K 85/00* (2013.01); *A01K 85/02* (2013.01)

(58) Field of Classification Search
CPC ........ A01K 85/00; A01K 85/02; A01K 83/02
USPC .......... 43/42.02, 42.11, 42.04, 37, 15, 34–36, 43/43.11, 41, 41.2
See application file for complete search history.

(56) References Cited

U.S. PATENT DOCUMENTS

| | | | | | |
|---|---|---|---|---|---|
| 384,853 | A | * | 6/1888 | Keller ................................. | 43/15 |
| 1,318,073 | A | * | 10/1919 | Gottschalk ............. | A01K 85/02 43/35 |
| 1,393,617 | A | * | 10/1921 | Frame .......................... | 43/42.02 |
| 1,758,160 | A | * | 5/1930 | Lee .............................. | 43/42.02 |
| 1,915,208 | A | * | 6/1933 | Walthers ................ | A01K 93/00 43/41.2 |
| 1,973,028 | A | * | 9/1934 | Thomas ........................ | 43/43.11 |
| 2,014,517 | A | * | 9/1935 | Beregow ................ | A01K 83/00 43/43.11 |
| 2,190,449 | A | * | 2/1940 | Goldammer .................. | 43/42.04 |
| 2,281,831 | A | * | 5/1942 | Courvelle ....................... | 43/26.1 |
| 2,325,107 | A | * | 7/1943 | Burns ............................. | 43/42.1 |
| 2,389,883 | A | * | 11/1945 | Worden ............................ | 43/37 |
| 2,545,385 | A | * | 3/1951 | Reppert et al. ..................... | 43/15 |
| 2,557,030 | A | * | 6/1951 | Inglis ................................ | 43/15 |
| 2,560,875 | A | * | 7/1951 | Knott ................................ | 43/15 |
| 2,577,552 | A | * | 12/1951 | White, Jr. .......................... | 43/15 |
| 2,616,205 | A | * | 11/1952 | Mason ......................... | 43/42.04 |
| 2,669,054 | A | * | 2/1954 | Smith, Sr. ..................... | 43/43.11 |
| 2,700,842 | A | * | 2/1955 | Lehmann ........................... | 43/35 |
| 2,712,197 | A | * | 7/1955 | Lewis ..................... | A01K 93/00 43/41.2 |
| 2,724,202 | A | * | 11/1955 | Heyman ............................ | 43/15 |
| 2,724,205 | A | * | 11/1955 | Howard ........................ | 43/42.02 |

(Continued)

*Primary Examiner* — Darren W Ark
(74) *Attorney, Agent, or Firm* — McHale & Slavin, P.A.

(57) ABSTRACT

The instant invention provides a chambered fishing lure having a releasable hook. The chambered fishing lure includes a main body; within the interior of the main body is a reloadable leader lure assembly chamber constructed and arranged to hold a reloadable leader lure assembly. A portion of the hook, as well as all the leader line, is housed within the internal chamber as well in the non-deployed state. Upon a fish strike and connection, the hook is released from the internal cavity, extending a desirable distance from the main body of the fishing lure and exposing the leader line to the external environment, defining the deployed state. The reloadable leader lure assembly is constructed and arranged to provide the user the ability to retract the leader line coupled to the hook back into the internal chamber of the device.

14 Claims, 18 Drawing Sheets

(56) References Cited

U.S. PATENT DOCUMENTS

| | | | | |
|---|---|---|---|---|
| 2,794,288 A * | 6/1957 | Marshall et al. | | 43/42.11 |
| 2,799,114 A * | 7/1957 | Turner | | 43/43.11 |
| 2,813,365 A * | 11/1957 | Cross | | 43/42.02 |
| 2,860,442 A * | 11/1958 | Turner | | 43/43.11 |
| 2,910,798 A * | 11/1959 | Bias | | A01K 93/00 |
| | | | | 43/41.2 |
| 2,950,559 A * | 8/1960 | Nelson | | 43/42.02 |
| 3,010,238 A * | 11/1961 | Crumrine, Jr. | | A01K 91/06 |
| | | | | 43/43.11 |
| 3,060,622 A * | 10/1962 | Lowry | | A01K 91/18 |
| | | | | 43/27.4 |
| 3,063,187 A * | 11/1962 | Abdelmaseh | | A01K 93/00 |
| | | | | 43/41.2 |
| 3,141,256 A * | 7/1964 | McBriar | | 43/43.11 |
| 3,214,858 A * | 11/1965 | Louie | | A01K 97/02 |
| | | | | 43/41.2 |
| 3,352,050 A * | 11/1967 | Mowrey | | A01K 91/02 |
| | | | | 43/41.2 |
| 3,364,613 A * | 1/1968 | Sewell | | 43/43.11 |
| 3,457,667 A * | 7/1969 | Tripp | | 43/42.02 |
| 3,611,613 A * | 10/1971 | Perches | | A01K 97/02 |
| | | | | 43/41.2 |
| 3,660,922 A * | 5/1972 | Chill | | 43/15 |
| 3,673,729 A * | 7/1972 | Lintz | | 43/43.11 |
| 3,694,951 A * | 10/1972 | Modeme | | A01K 93/00 |
| | | | | 43/41.2 |
| 3,703,783 A * | 11/1972 | Pool | | A01K 91/02 |
| | | | | 43/43.11 |
| 3,735,518 A * | 5/1973 | Kleine et al. | | 43/42.04 |
| 3,739,517 A * | 6/1973 | Schleif | | 43/37 |
| 3,818,626 A * | 6/1974 | Peippo | | 43/42.04 |
| 3,878,634 A * | 4/1975 | Quimpo | | 43/15 |
| 4,079,538 A * | 3/1978 | Burnett | | A01K 85/16 |
| | | | | 43/36 |
| 4,251,941 A * | 2/1981 | Howard | | 43/43.11 |
| 4,442,622 A * | 4/1984 | Sartain | | 43/37 |
| 4,534,127 A * | 8/1985 | Thorvaldsen | | A01K 93/00 |
| | | | | 43/41.2 |
| 4,825,580 A * | 5/1989 | Gray | | 43/43.11 |
| 4,953,317 A * | 9/1990 | Ruchel | | A01K 97/01 |
| | | | | 43/17 |
| 5,035,075 A * | 7/1991 | Pearce | | 43/42.02 |
| 5,090,151 A * | 2/1992 | Salminen | | A01K 85/00 |
| | | | | 43/42.05 |
| 5,123,196 A * | 6/1992 | Pagano et al. | | 43/37 |
| 5,168,651 A * | 12/1992 | Wilson | | A01K 93/02 |
| | | | | 43/15 |
| 5,440,831 A * | 8/1995 | Chandler | | 43/43.11 |
| 5,806,233 A | 9/1998 | Murphy | | |
| 5,832,654 A * | 11/1998 | McQueeny | | 43/42.04 |
| 5,950,347 A * | 9/1999 | McQueeny | | 43/42.04 |
| 6,006,466 A * | 12/1999 | Washecka | | 43/43.11 |
| 6,094,853 A * | 8/2000 | Lim | | A01K 85/02 |
| | | | | 43/43.11 |
| 6,105,303 A * | 8/2000 | Hall, Sr. | | A01K 85/02 |
| | | | | 43/43.11 |
| 6,272,786 B1 * | 8/2001 | Braden | | 43/42.41 |
| 6,308,453 B1 * | 10/2001 | Meyer | | 43/37 |
| 6,546,663 B1 * | 4/2003 | Signitzer et al. | | 43/42.02 |
| 6,880,285 B1 * | 4/2005 | Frost et al. | | 43/15 |
| 7,111,426 B2 * | 9/2006 | Iliev | | 43/42.02 |
| 7,254,916 B2 * | 8/2007 | Mussot | | 43/42.41 |
| 7,757,425 B2 * | 7/2010 | Herasymchuk | | A01K 85/01 |
| | | | | 43/42.23 |
| 8,316,577 B2 * | 11/2012 | Hale | | A01K 89/08 |
| | | | | 43/43.11 |
| 8,387,303 B2 * | 3/2013 | Abraham et al. | | 43/26.2 |
| 8,689,479 B1 * | 4/2014 | Smith | | 43/37 |

* cited by examiner

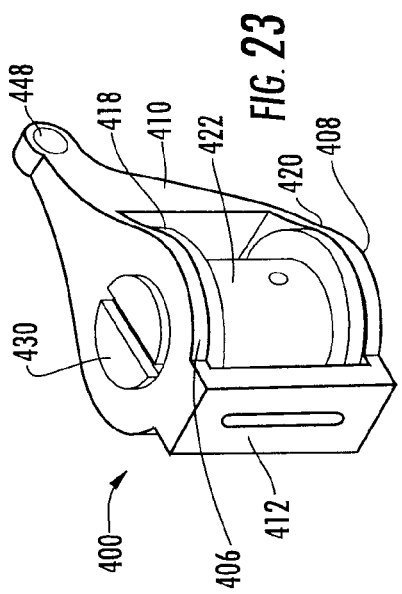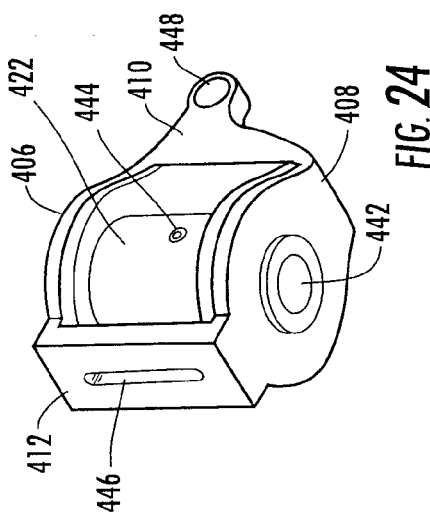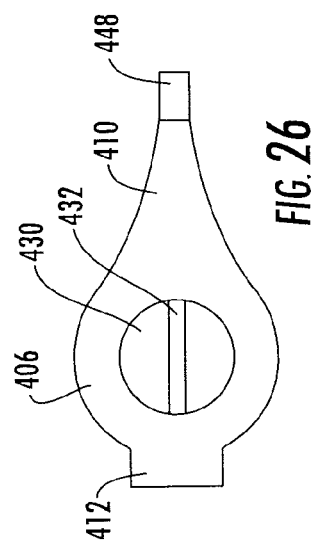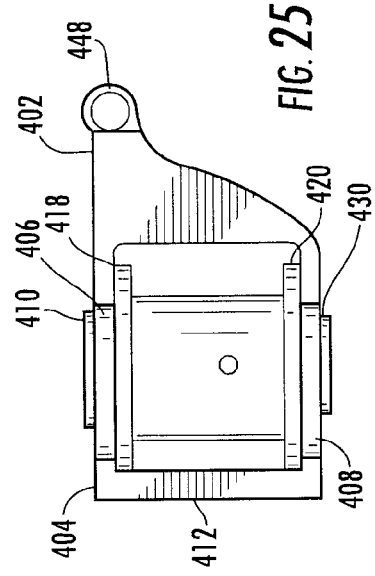

CHAMBERED LEADER LURE

CROSS REFERENCE TO RELATED APPLICATIONS

This application is a continuation in part of U.S. Application No. 61/416,158, filed Nov. 22, 2010, entitled "Chambered Leader Lure", the contents of which are incorporated herein by reference in their entirety.

FIELD OF THE INVENTION

The present invention relates to fishing devices, and more particularly to a chambered fishing lure having an internal spool for providing compact storage for an extendable leader. A hook is secured to the distal end of the leader and is secured to the lure in a releasable manner to allow a controlled release of the hook and the leader.

BACKGROUND OF THE INVENTION

The broad concept of a fishing lure having a releasable hook is known in the art. For example, U.S. Pat. No. 5,090,151 describes a fishing lure in which the hook and body separate when a strike occurs. The fishing lure comprises of a lure body, a hook, and a wire member. The body has a slot extending therethrough with a shoulder located along the slot. The hook includes an elongated shank with a projection therein which normally engages the shoulder on the lure body, so the hook remains engaged with the lure body. The wire member extends therethrough the lure body and is attached on one end to a hook eyelet and to the fishing reel on the opposite end. The hook is housed in the slot with the re-bent bight portion extending outside the lure body. The lure body shoulder is releasably engaged with the shank and projection of the hook, where upon a strike, the body and hook separate with the lure body sliding up the wire member.

U.S. Pat. No. 5,806,233 describes a fishing lure which exhibits a relative lost motion between the body of the lure and the hook upon a fish strike. The fishing lure comprises of a lure body, a limb, an elastomeric band, a fishing line, and a hook. The lure body has a leading end and a trailing end. The limb, having an eye formed on one end thereof, is coupled to the trailing end of the lure body. The eye on the limb is outwardly extending from the trailing end of the lure body. The hook includes a shank with an eyelet formed thereon. The hook is tethered to the limb using a length of fishing line fastened at the hook's eyelet at one end and the limb's eye at the opposite end thereof. An elastomeric band confining surrounds and releasably holds the hook, limb, and fishing line in a juxtaposed position rearwardly remote from the trailing end of the lure body. Upon a fish strike at the hook, the hook and fishing line move out from the band and the hook proceeds in the opposite direction to travel with the fish.

U.S. Pat. No. 6,105,303 discloses a fishing lure that does not have an exposed hook until sufficient tension is placed on the line. The lure comprises of a lure body, a fishing line, and a hook. The body has an aperture therethrough and at least one channel. The fishing line extends through the aperture and is attached to the shank of the hook. The hook is placed into a channel, changing the direction the fishing line runs from in the aperture, so that the fishing line in the channel runs in the opposite direction of that in the aperture. Using this configuration, the hook will be dislodged from the body if sufficient tension is placed on the fishing line.

SUMMARY OF THE INVENTION

The present invention relates to fishing devices, and more particularly to a chambered fishing lure having an internal spool for providing compact storage for an extendable leader. The chambered fishing lure includes a main body having a front end, a back end, a top side, a bottom side, and an interior chamber. Within the interior chamber of the main body is a spool constructed and arranged to provide storage for an extended leader assembly. A hook is secured to the distal end of the leader assembly and releasably engaged with the back end portion of the lure in a non-deployed state. Upon a fish strike and connection, the hook is released from the lure, extending the distal end of the leader, and thus the hook, a predetermined distance from the main body of the fishing lure in a controlled manner. The spool assembly is constructed and arranged to provide the user the ability to retract the leader line coupled to the hook back into the internal chamber of the device wherein the hook is reset within the lure body for the next strike. The spool assembly is generally a small spool positioned within the internal cavity on bearings positioned at the distal ends of the spool. Portions of the spool may extend to the outside of the lure to allow rotational operation of the reel by hand or tool. Alternatively, a key, tool or the like may be inserted through an aperture or engaged to a key-slot in a spool to allow the leader line to be recoiled into the lure. In yet another embodiment, the reel may be provided with an internal recoiling spring that automatically recoils the leader onto the spool after being pulled outwardly therefrom. A drag or clutch may also be included between the spool and the lure to apply a predetermined resistance to pulling the leader outwardly from the spool. The drag feature may be adjustable to allow the operator to alter the characteristics of the way the leader is released from the spool.

Accordingly, it is an objective of the instant invention to provide a chambered fishing lure having a releasable hook.

It is a further objective of the instant invention to provide a chambered fishing lure having a releasable hook in which a portion of the hook is housed within an internal chamber.

It is yet another objective of the instant invention to provide a chambered fishing lure having a releasable hook which maintains a more natural appearance.

It is a still further objective of the instant invention to provide a chambered fishing lure having a releasable hook which maintains a low visibility.

It is a further objective of the instant invention to provide a chambered fishing lure having a releasable hook which maintains a better lure action with lighter leader and/or main line.

It is yet another objective of the instant invention to provide a chambered fishing lure having a releasable hook which traverses between a non-deployed state and a deployed state.

It is a still further objective of the invention to provide a chambered fishing lure in which fish can be cleanly hooked once the leader is released and deployed.

It is yet another objective of the instant invention to provide a chambered fishing lure having a releasable hook in which the fish can not shake the lure from its mouth.

It is yet another objective of the instant invention to provide a chambered fishing lure having a releasable hook in which the leader line is concealed within an internal chamber and is attached to a reloadable leader assembly.

It is a further objective of the instant invention to provide a chambered fishing lure having a releasable hook which can be easily reloaded to the non-deployed state with minimal tools.

It is still yet a further objective of the instant invention to provide a fishing lure having an internal reel assembly for storing the leader line.

It is still yet a further objective of the instant invention to provide a fishing lure having an internal reel assembly that includes an externally operable mechanism for rewinding the leader line about the spool.

It is still yet a further objective of the instant invention to provide a fishing lure having an internal reel assembly that includes an internally operable mechanism for rewinding the leader line about the spool.

It is still yet a further objective of the instant invention to provide a fishing lure having an internal reel assembly including a clutch assembly that provides a predetermined amount of resistance to pulling the leader line from the spool.

It is still yet a further objective of the instant invention to provide a fishing lure having an internal reel assembly including a recoil spring assembly for providing a predetermined amount of resistance to pulling the leader line from the spool.

It is still yet a further objective of the instant invention to provide a fishing lure having an internal reel assembly including a recoil spring assembly for retracting the leader line.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 23 is a top perspective view of an alternative embodiment of the reloadable leader assembly in accordance with the instant invention;

FIG. 24 is a bottom perspective view of the alternative embodiment of the reloadable leader assembly illustrated in FIG. 23;

FIG. 25 is a side elevational view of the alternative embodiment of the reloadable leader assembly illustrated in FIG. 23;

FIG. 26 is a top view of the alternative embodiment of the reloadable leader assembly illustrated in FIG. 23;

DETAILED DESCRIPTION OF THE INVENTION

Figure 1:
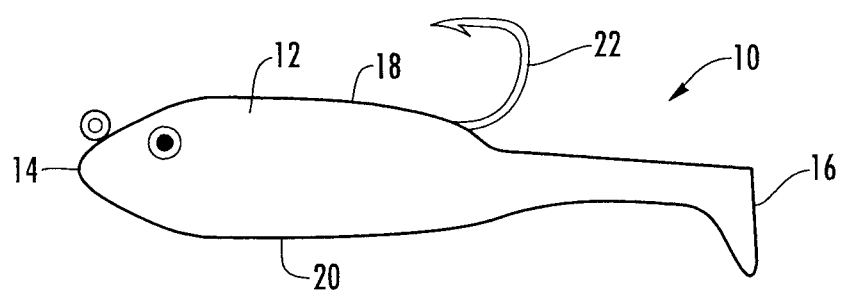
FIG. 1 is a side view of one embodiment of the fishing lure of the instant invention having a releasable hook in the non-deployed position.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring generally to FIGS. 1-31 in which similar reference characters denote similar elements throughout the several views, a chambered fishing lure 10 having a releasable leader 34 and hook 22 of the instant invention is illustrated. Referring to FIG. 1, a side view of one embodiment of the chambered fishing lure 10 having a releasable hook 22 of the instant invention, illustrated as a swimbait style fishing lure. The chambered fishing lure 10 includes a body 12 having a front portion 14, a back portion 16, a top portion 18, and a bottom portion 20. The body 12 may be made of any material(s) commonly used in the manufacturing of fishing lures, but is preferably made of a polymeric material such as plastic. The body 12 may contain markings, colorations, or be shaped to resemble baitfish, mice, crayfish, insects, frogs, or other animals and/or objects that fish prey upon. Attached to the chambered fishing lure 10 is a releasable hook 22. As illustrated, the hook is arranged in the "non-deployed" position in which little or no leader line is exposed. This is the typical starting position when the fisherman places the lure into the water.

Figure 2:
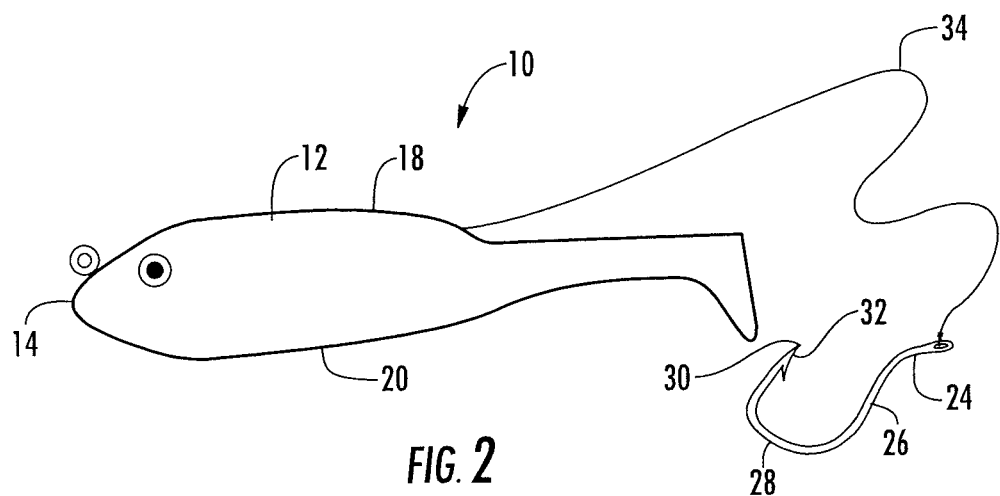
FIG. 2 is a side view of one embodiment of the fishing lure of the instant invention having a releasable hook in the deployed position.

Referring to FIG. 2, a side elevational view of the chambered fishing lure 10 having a releasable hook 22 is illustrated in the deployed position. In the deployed position, the leader 34 is extended so that the hook 22 is positioned at a predetermined distance away from the body 12. The deployed position typically results from a fish strike in which the fish actually bites at and contacts the lure. In this situation, the fish may realize that it has bitten something that it does not want to eat so that the lure is released but the hook is retained in its mouth. The hook is preferably a standard fishhook, having an eyelet 24, a shank 26, a bight portion 28, and a pointed terminal end 30 with or without a barb 32. The hook 22 may be coated with a protective coating to prolong the useful life of the hook by providing protection from the adverse effects of the environment, such as rusting, corroding, or other weathering. Coupling the hook 22 to the body 12 of the chambered fishing lure 10 is a leader line 34, such as but not limited to a fluorocarbon leader line or a monofilament leader line, braided metal or polymeric material or suitable combinations thereof.

Figure 3:
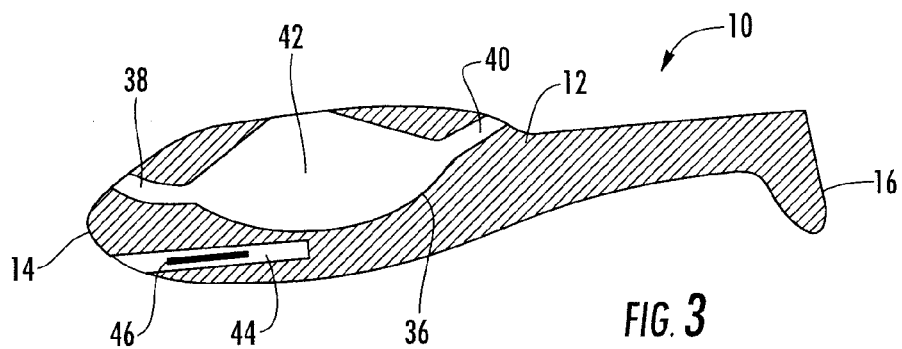
FIG. 3 is a longitudinal cross-sectional view of the reloadable leader assembly chamber of the fishing lure of the instant invention.
Figure 4:
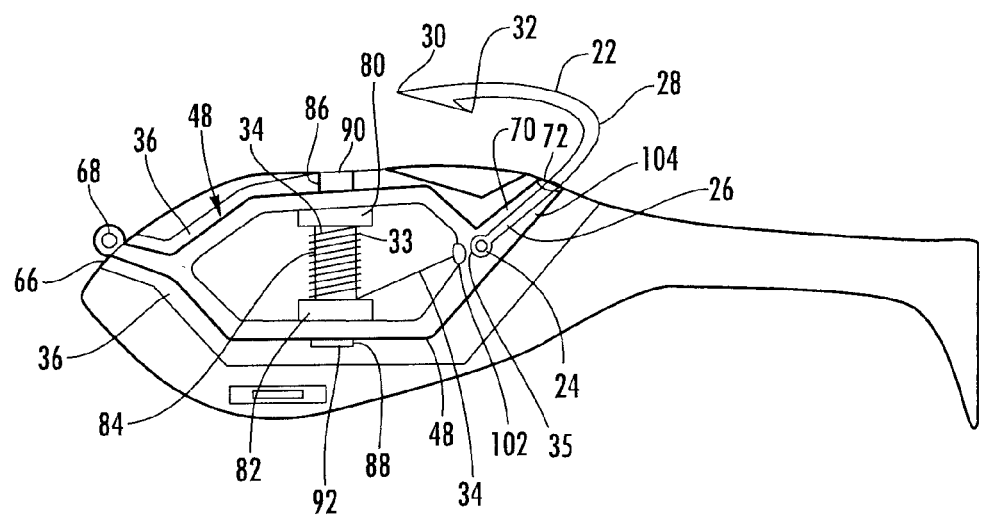
FIG. 4 is a longitudinal cross-sectional view of one embodiment of the reloadable leader assembly of the fishing lure having a releasable hook, illustrating positioning within the reloadable leader assembly chamber.

Referring to FIGS. 3 and 4, longitudinal cross-sectional views showing the internal elements of the chambered fishing lure are illustrated. Positioned within the interior of the body 12 is a reloadable leader assembly chamber 36. The reloadable leader assembly chamber 36 may contain a first end 38 and a second end 40 connected by a mid portion 42. A second chamber 44 is constructed and arranged to hold a weighted object 46 diving blade or spoon (not shown) or the like. Alternatively, the weighted object 46 may be molded within the body at any suitable location for creating different action or movement to the lure when moved through the water. Placed within the reloadable leader lure assembly chamber 36 is a reloadable leader assembly, illustrated herein as a spool assembly 48. In general, the spool assembly is constructed and arranged to contain a predetermined length of leader line in a coiled or otherwise controllably releasable configuration. The spool assembly also permits the leader line to be rewound or otherwise repositioned within the cavity of the lure for repeated deployments.

Figure 5:
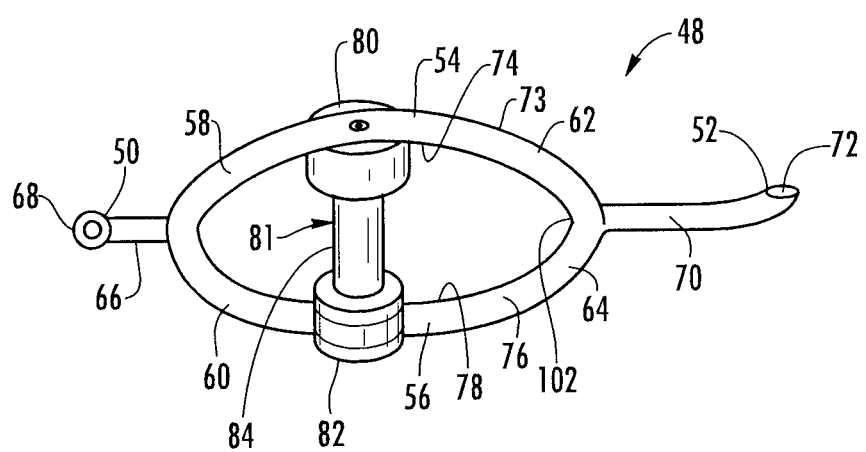
FIG. 5 is a perspective view of the reloadable leader assembly of the fishing lure.

Referring to FIG. 5, a perspective view of an illustrative example of the spool assembly 48 is shown. The spool assembly 48 has a first end 50 and a second end 52. The spool assembly 48 comprises two support arms 54 and 56. The first end 58 of the support arm 54 connects to the first end 60 of support arm 56. The second end 62 of the support arm 54 connects to the second end 64 of support arm 56. Extending from the point of interconnection of the first end 58 of the support arm 54 and the first end 60 of support arm 56 is arm 66. At the terminal end of arm 66 is an eyelet 68. Extending from the point of interconnection of the second end 62 of the support arm 54 and the second end 64 of the support arm 56 is arm 70. At the terminal end of arm 70 is an aperture 72. The aperture 72 is sized and shaped to allow a hook, when inserted within the hollow interior of the arm 70, to fit snuggly therein with the aperture 72 engaging opposing sides of the eye 24 and shank 26 of the hook, thereby preventing rotational movement while still allowing easy or controlled release. The support arm 54 contains a top surface 73 and a bottom surface 74. The support arm 56 contains a top surface 76 and a bottom surface 78.

Engaged with the support arm 54 is a spool 81 which generally includes a first circular member 80, a second circular member 82 and a drum 84. Attached to the first circular member 80 and the second circular member 82 is a pivot assembly, illustrated herein as spindles 86 and 88, respectively, see FIG. 4. The spindles 86 and 88 can be coupled to the support arms 54 and 56 in such a manner as to provide rotational movement of drum 84 about its longitudinal axis 89 (see FIG. 6A). While the pivot assembly is illustrated as appendages, the pivot assembly can contain other elements that produce rotational spin about an axis. For example, the pivot assembly could be a longitudinal member, such as an axle, fixed in position with a bearing or bushing inside an opening in the first and second circular members. Alternatively, the first and second circular members may be fixed to the axle, with bearings or bushings provided at the connecting points where the axle is supported. The pivot assembly may include additional mechanical means of generating rotation, such as the use of gears, ratchet and pawl systems or the like.

Figure 6A:
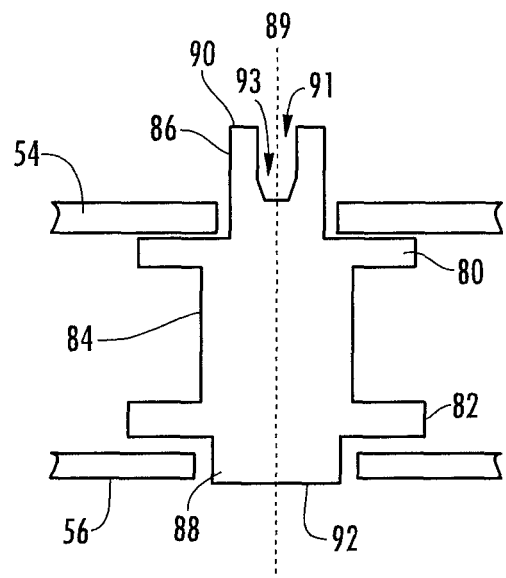
FIG. 6A is a cross-sectional view of the reloadable leader assembly of the instant invention.
Figure 6B:
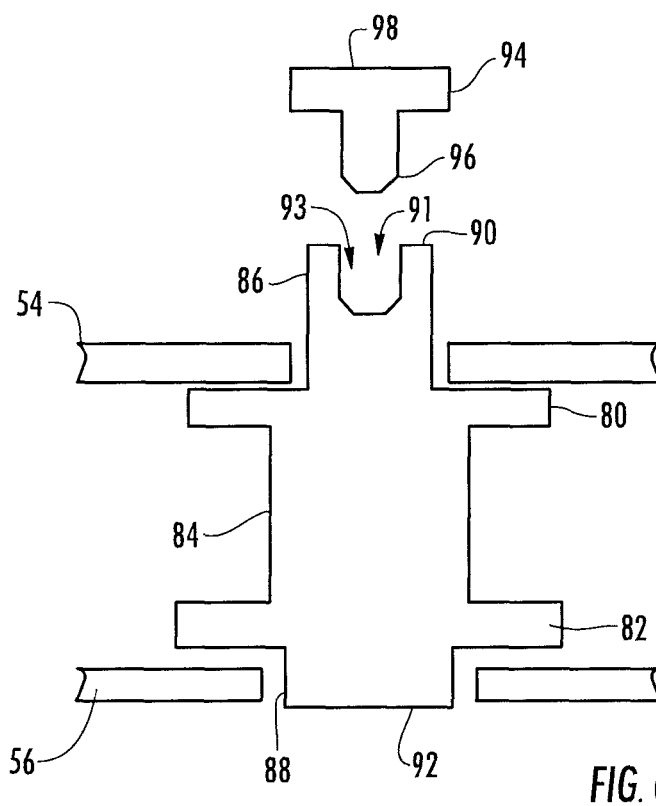
FIG. 6B is a cross-sectional view of the reloadable leader assembly of the instant invention with a tool for providing rotation.
Figure 7:
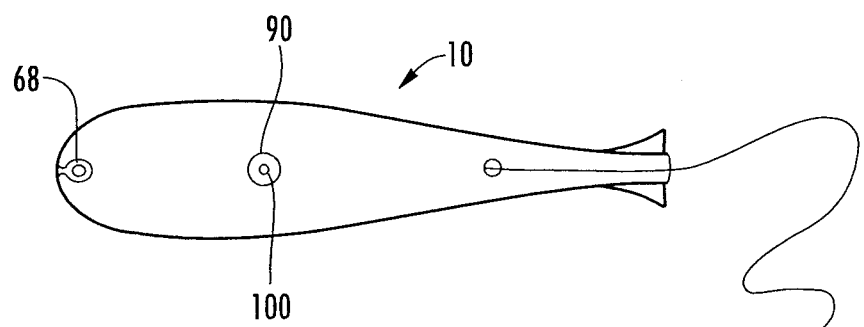
FIG. 7 is a top view of the fishing lure having a releasable hook as illustrated in FIG. 2.

Referring to FIGS. 5, 6A and 6B, the top surface 90 of spindle 86 and/or the top surface 92 of spindle 88 may be constructed and arranged to provide the ability of retracting the leader lure after deployment. For example, the top surface 90 of the spindle 86 may contain an opening 91 which exposes a recessed cavity 93. The recessed cavity is constructed and arranged to receive a tool 94. The terminal end 96 of the tool 94 is conjugately shaped to or has a complementary geometrical shape, i.e. cross shape associated with a Phillips screw head or polygon or other suitable shape, with the shape of the recessed cavity 93, such that insertion of the tool within provides a secure fit. To provide rotation of the drum 84, once inserted, the user simply rotates the handle 98 of tool 94 in a clockwise direction to rotate the drum in a clockwise direction, or a counterclockwise direction to rotate the drum in a counterclockwise direction. Alternatively, the top surface 90 may simply contain a slotted region 100 which matches the shape of a common slotted screwdriver or United States coin, see FIG. 7.

Referring to FIG. 4, wrapped around drum 84 is a leader line 34. A first end 33 of the leader line 34 is secured to the drum 84 through various means known to one of skill in the art, including a knot, slot, hook, fastener, staple or suitable combination thereof. As illustrated in FIGS. 4 and 5, the second end 35 of the leader line 34, i.e. the end not attached to the drum, is inserted through opening 102 and is secured to the eyelet 24 of hook 22 through, for example, an improved clinch knot, Palomar knot, Snell knot, crimp sleeve or the like. In the non-deployed position, the eyelet 24 and the shank 26 of hook 22 rests within the internal cavity 104 of the arm 70. The bight portion 28 and the pointed terminal end 30 with barb 32 of the hook 22 are exposed to the external environment through the opening 72.

Figure 8:
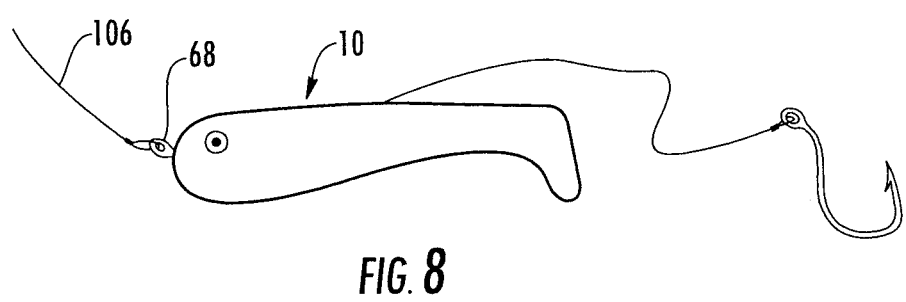
FIG. 8 is a side elevational view of the fishing lure having a releasable hook attached to a main fishing line.

Prior to placing the chambered fishing lure 10 into the water, a fishing line or wire 106, see FIG. 8, which connects to a fishing pole, downrigger, outrigger or the like (not illustrated), is attached to the eyelet 68, through any suitable means known in the art, for example, a Uni-knot, a Rapala knot, or a Trilene knot. Once placed in the water and struck by a fish, the hook 22 of the chambered fishing lure 10 is deployed. As a result of the deployment, the leader line 34 is unwound from the drum 84, exposing the leader line and the portion of the hook housed within the chambered fishing lure 10 to the external environment. Such unwinding could be a result of a fish biting the chambered fishing lure 10 or the hook being attached to some other item. In either case, to reuse the chambered fishing lure 10, the leader line 34 must be placed back in the non-deployed position. To wind the leader line 34 back onto the drum 84, the user can simply insert tool 94, see FIG. 6B, into the recessed cavity 93 located on spindle 86, and rotate in a clockwise direction. Should the user need to unwind all or a portion of the leader line 34 from the drum 84, the tool 94 can be used to rotate the drum 84 in a counterclockwise direction.

Figure 9:
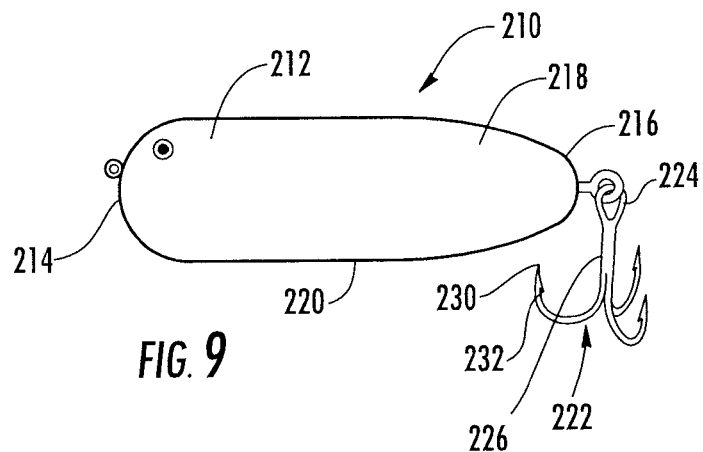
FIG. 9 illustrates an alternative embodiment of the fishing lure of the instant invention having a releasable hook in the non-deployed position.
Figure 10:
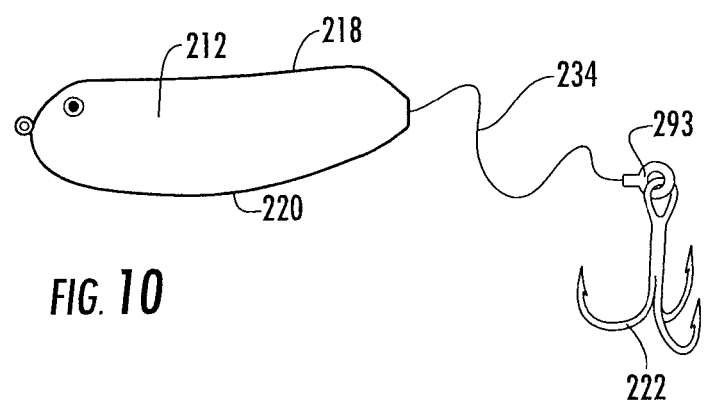
FIG. 10 illustrates an alternative embodiment of the fishing lure of the instant invention having a releasable hook in the deployed position.

FIGS. 9-10 illustrate an alternative embodiment of the chambered fishing lure 10. FIG. 9 is a side view of an embodiment of the chambered fishing lure having a releasable treble style hook 222, illustrated as a plug style fishing lure 210. The plug style fishing lure includes a body 212 having a front end 214, a back end 216, a top side 218, and a bottom side 220. The body 212 may be hand carved from wood, such as balsa, hardwoods, or pine, as traditionally done for fishing plugs. However, in a preferred embodiment, the body 212 is made from hollow plastics, molded plastics, or hard plastics. The body 212 may contain markings, colorations, or be shaped to resemble baitfish, mice, crayfish, insects, frogs, or other animals that fish prey upon. Attached to the plug style fishing lure 210 may be a treble style hook 222. As illustrated in FIG. 9, the hook is positioned in the "non-deployed" position in which little, or no, leader line 234 is exposed. FIG. 10 illustrates the plug style fishing lure 210 with the treble hook 222 in a deployed position. In the deployed position, the hook 222 is located at a predetermined distance away from the body 212. The position is typically a result of a fish strike in which the fish bites at and makes contact with the lure, attaching to the hook. The hook, as illustrated, is a standard treble hook having an eyelet 224, a shank 226, a plurality of bight portions 228, and a plurality of pointed terminal ends 230 with or without barbs 232. However, the treble hook connected to the chambered fishing lure 210 may be any hook known to one of skill in the art. The hook 222 may be coated with a protective coating to prolong the useful life of the hook by providing protection from the adverse effects of the environment, such as rusting, corroding, or other weathering. Coupling the hook 222 to the body 212 of the chambered fishing lure 210 is a leader line 234.

Figure 11:
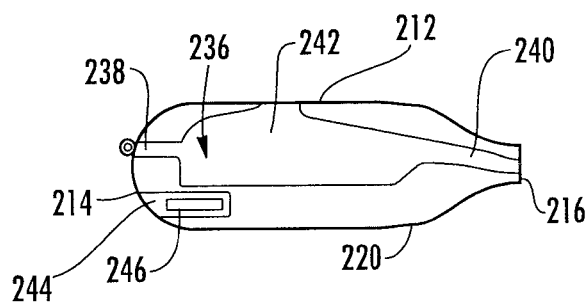
FIG. 11 is a longitudinal cross-section of the fishing lure of the instant invention as illustrated in FIG. 10.
Figure 12:
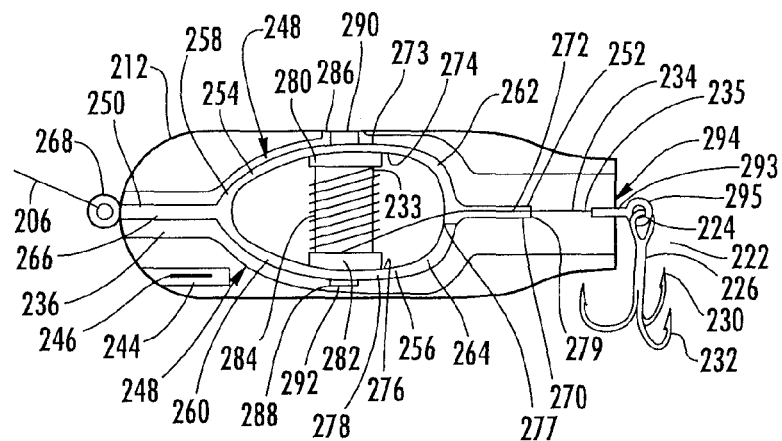
FIG. 12 illustrates the fishing lure having a releasable hook as illustrated in FIG. 9 with the reloadable leader lure assembly.

Referring to FIGS. 11 and 12, a longitudinal cross-sectional view showing the internal elements of the plug style chambered fishing lure 210 is illustrated. Positioned within the interior of the body 212 is a reloadable leader assembly chamber 236 constructed and arranged to hold a reloadable leader assembly, illustrated herein as a spool assembly, and described previously. The reloadable leader assembly chamber 236 may contain a first end 238 and a second end 240 connected by a mid portion 242. A second chamber 244 may be included to hold a weighted object 246, blades, spoons etc. to provide various diving, swimming, floating or sinking characteristics to the lure as it is traversed through the water. As illustrated in FIG. 12, the chambered fishing lure 210 may contain a reloadable leader assembly, illustrated as spool assembly 248, housed within the interior body 212 and placed within the reloadable leader lure assembly chamber 236. The spool assembly 248 has a first end 250 and a second end 252. The spool assembly 248 comprises two support arms 254 and 256. The first end 258 of the support arm 254 connects to the first end 260 of support arm 256. The second end 262 of the support arm 254 connects to the second end 264 of support arm 256. Extending from the point of interconnection of the first end 258 of the support arm 254 with the first end 260 of the support arm 256 is arm 266. At the terminal end of the arm 266 is an eyelet 268 which extends from the interior portion of the body 212 to the external environment and can be used to attach a fishing line or wire 206 to a fishing pole or the like. Extending from the point of interconnection of the second end 262 of the support arm 254 with the second end 264 of the support arm 256 is arm 270. The arm 270 contains an internal cavity 272 which is constructed and arranged to allow passage of the leader line 234 through apertures 277 and 279. The support arm 254 contains a top surface 273 and a bottom surface 274. The support arm 256 contains a top surface 276 and a bottom surface 278.

Engaged with the support arm 254 is a first circular member 280. Engaged with the support arm 256 is a second circular member 282. Connecting the first circular body 280 to the second circular member 282 is a drum 284. Attached to the first circular member 280 and the second circular member 282 is a pivot assembly, illustrated herein as spindles 286 and 288, respectively. The spindles 286 and 288 can be coupled to the support arms 254 and 256 in such a manner as to provide rotational movement of the drum 284 about its longitudinal axis, not illustrated. While the pivot assembly is illustrated as appendages, the pivot assembly can contain other elements that produce rotational spin about an axis. For example, the pivot assembly could be a longitudinal member, such as an axle, fixed in position with a bearing or bushing inside an opening in the first and second circular members. Alternatively, the first and second circular members may be fixed to the axle, with bearing or bushings provided at the counting points where the axle is supported. The pivot assembly may include additional mechanical means of generating controlled rotation, such as use of drag assemblies, clutches, gears or ratchet and pawl systems.

The top surface 290 of spindle 286 and/or the top surface 292 of spindle 288 may be constructed and arranged to provide the ability of retracting the leader 234 after deployment. For example, the top surface 290 of the spindle 286 may contain an opening which exposes a recessed cavity, as described previously. The recessed cavity is constructed and arranged to receive the tool 94 as illustrated in FIGS. 6A and 6B.

Figure 13A:
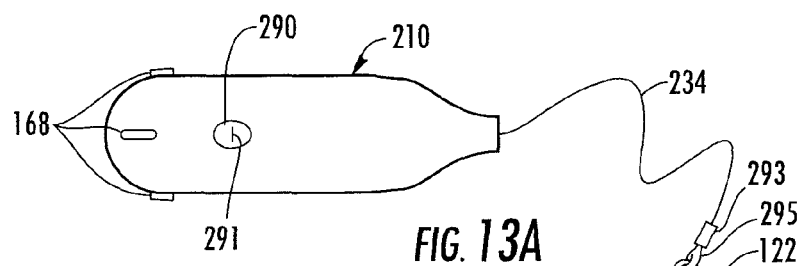
FIG. 13A is a top view of the fishing lure having a releasable hook as illustrated in FIG. 10.
Figure 13B:
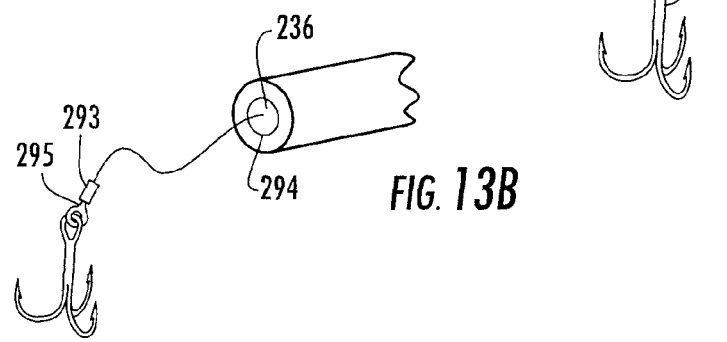
FIG. 13B is a rear view of the fishing lure having a releasable hook as illustrated in FIG. 10.

Referring to FIG. 13A, a top view of one embodiment of the chambered fishing lure 210 illustrating the top surface 290 of the spindle 286 extending through the surface of the main body 212. The top surface 290 of the spindle 286 contains a slot 291 which can be used to gather leader line 234 back onto drum 284. While the top surface 290 is illustrated having a slot constructed and arranged to match the shape of a common slotted screwdriver or United States coin, other shapes such as a cross shape associated with a Phillips screw head or polygon or any other suitable shape can be used. In this configuration, the leader line 234 can be tightly wrapped around drum 284, assuming the non-deployed position. Referring back to FIG. 12, the first end 233 of the leader line 234 is fastened to the drum 284 through various means known to one of skill in the art, including, but not limited to, a knot, slot, hook, fastener, staples or suitable combination thereof. The second end 235 of the leader line 234 enters the internal cavity 272 of arm 270 through an opening 277 and exits the internal cavity 272 through opening 279. The second end of the leader line 234 terminates with a crimp ring 293. An eyelet 295 connected to the crimp ring 293 secures to the eyelet 224 of hook 222. In the non-deployed position, the eyelet 224 and the shank 226 of hook 222 may rest within a portion of the leader lure assembly chamber 236. However, in a preferred embodiment, the eyelet 224, the shank 226 of hook 222, the bight portion 228 and the pointed terminal end 230 with or without barbs 232 of the hook 222 are exposed to the external environment and connect to the eyelet 295 of the plug 293 which contains a portion housed within the chamber 236 and a portion exposed to the environment through opening 294, see also FIG. 13B. The crimp ring 293 is constructed and arranged to snuggly fit within opening 294 and/or the chamber 236. To rewind the leader line 234 back onto drum 284, the user can simply insert the tool 94 and rotate the tool in the clockwise or counter-clockwise direction, as described previously. Once the leader line 234 is bound to the drum 284, if not already attached, the user attaches a fishing wire, which is connected to a fishing pole, to eyelet 268 and places the chambered fishing lure 210 back into the water.

Figure 14:
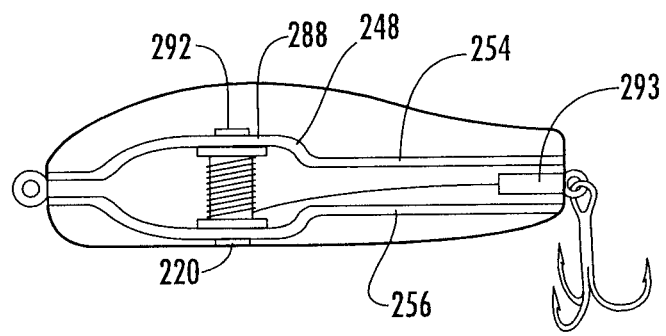
FIG. 14 illustrates the reloadable leader lure assembly positioned at the bottom end of the fishing lure of the instant invention having a releasable hook.
Figure 15:
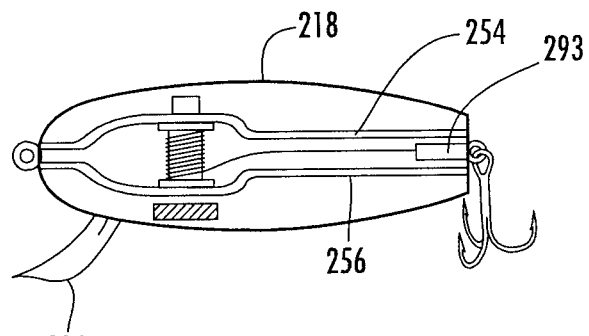
FIG. 15 illustrates the fishing lure of the instant invention having a releasable hook in the form of a diving style lure.

FIGS. 14-15 illustrate alternative embodiments of the chambered fishing lure 210. Referring to FIG. 14, the location of the spool assembly 248 is positioned such that the bottom end 220 contains the reloading functionality. In this arrangement, the top surface 292 of the pivot member 288 contains a slot or recessed cavity, as described previously (see FIG. 12), which can be used to gather the leader line 234 back onto drum 284. The embodiment illustrated in FIG. 14 does not include the second chamber 244 or weighted object 246. Exclusion of the second chamber 244 or weighted object 246 allows the chambered fishing lure 210 to act as a topwater style lure, remaining at or near the surface. Additionally, the sport arm 254 and the support arm 256 of the spool assembly 248 are arranged in a generally parallel manner and do not directly connect to each other. The ends of each of the arms are connected to a portion of the body of the device. FIG. 15 illustrates the chambered fishing lure 210 as a diving style lure. In addition to the features as described above, the chambered fishing lure 210 can be constructed and arranged to include one or more diving lips 296. The diving lips 296 can be constructed and arranged to provide the capability of diving into various depths of water or providing swimming motion to the lure depending on the desire of the fisherman. The spool assembly 248 may be constructed in a similar manner to that described previously, containing a portion in which arms 254 and 256 directly connect and a portion in which the arms remain generally parallel to each other.

Figure 16:
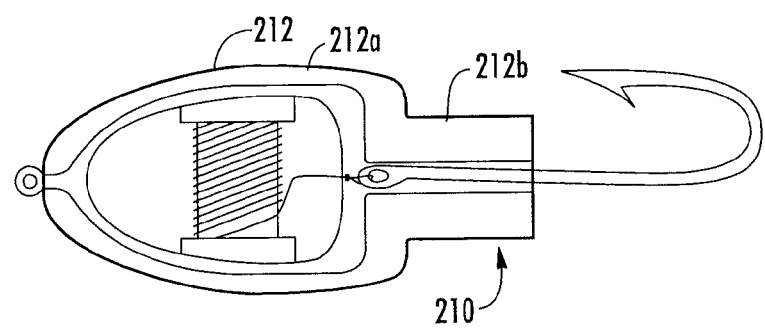
FIG. 16 illustrates the fishing lure of the instant invention having a releasable hook as a trolling lure.
Figure 17:
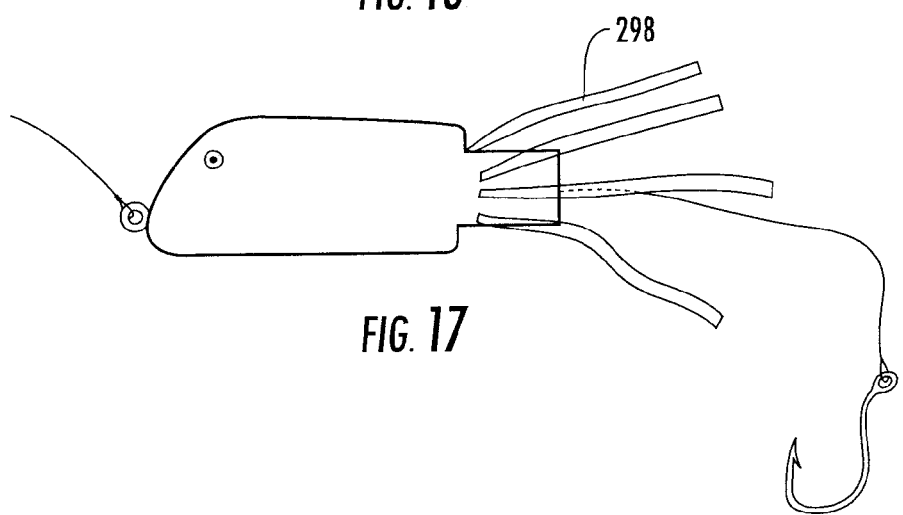
FIG. 17 illustrates the fishing lure of the instant invention having a releasable hook as a trolling lure with a skirt.

FIG. 16 illustrates an alternative embodiment of the chambered fishing lure 210, in the shape of a trolling lure. The chambered fishing lure 210 contains all the features, or combinations of features, as the previously described embodiments. The main body 212 contains a rounded portion 212a and a generally rectangular portion 212b. Attached to the rectangular portion 212b is a silicone skirt 298, see FIG. 17. In this embodiment, the main body portion may be formed from a metal which has a high density. The metal may be coated with one or more well known materials for preventing corrosion and degradation of the metal during normal use.

Figure 18:
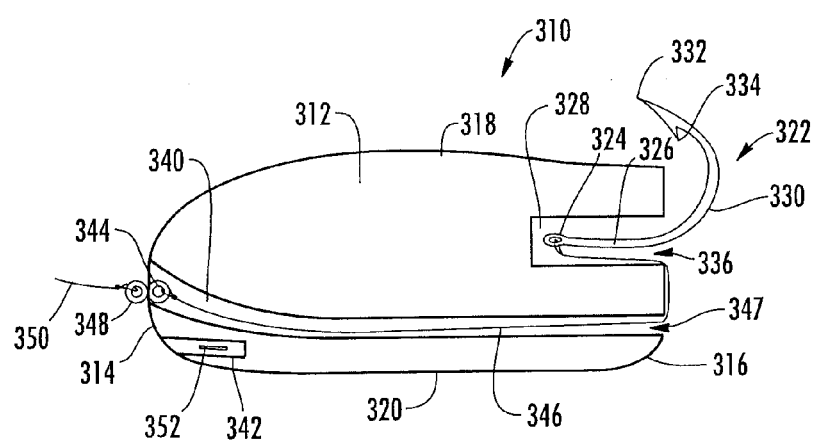
FIG. 18 is an alternative embodiment of the fishing lure of the instant invention having a releasable hook, illustrated in the non-deployed state without the reloadable leader assembly.
Figure 19:
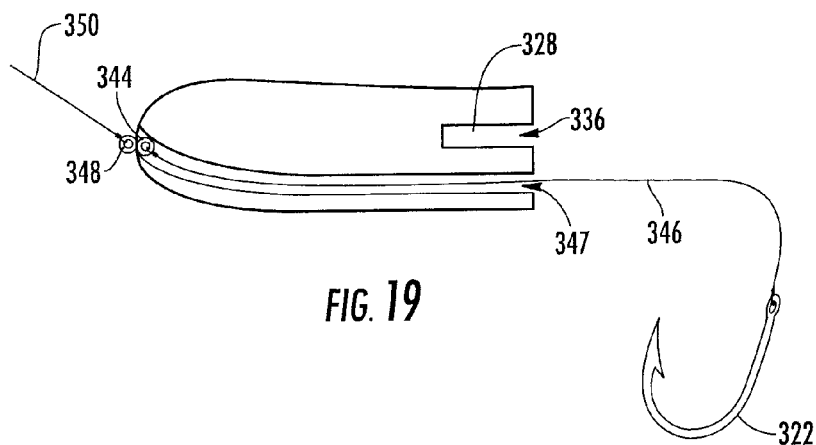
FIG. 19 is an alternative embodiment of the fishing lure of the instant invention having a releasable hook, illustrated in the deployed state without the reloadable leader assembly.
Figure 20A:
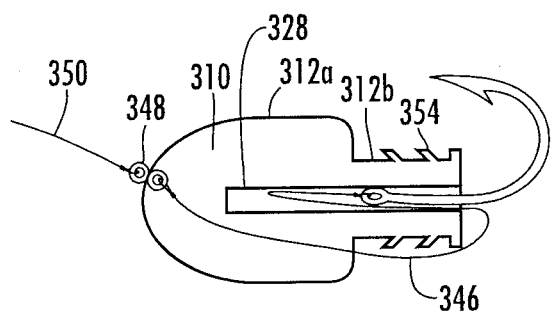
FIG. 20A is an alternative embodiment of the fishing lure of the instant invention having a releasable hook in the form of a jig, illustrated in the non-deployed state without the reloadable leader assembly.
Figure 20B:
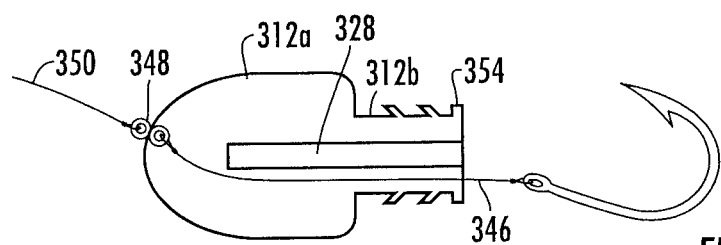
FIG. 20B is an alternative embodiment of the fishing lure having a releasable hook of the instant invention in the form of a jig, illustrated in the deployed state without the reloadable leader assembly.

FIGS. 18-22B illustrate alternative embodiments of the chambered fishing lure 310 without the spool assembly. Referring to FIG. 18, the chambered fishing lure 310 includes a body 312 having a front end 314, a back end 316, a top side 318, and a bottom side 320. Attached to the chambered fishing lure 310 is a fishing hook 322. The fishing hook eyelet 324 and shank 326 of hook 322 are contained in a cavity 328 positioned at or towards the back end 316 of body 312. The bent bight portion 330 and the pointed terminal end 332 with barb 334 are exposed to the external environment through an aperture 336 of the cavity 328. The interior portion of body 312 includes one or more chambers 340 and 342. At one end of chamber 340 is a leader lure eyelet 344 for attachment of the leader line 346. At the opposite end of the chamber 340 is an aperture 347. The aperture 347 allows passage of the leader line 346 through the internal chamber 340, exposing a portion of the leader line to the external environment. The opposite end of the leader line is connected to the hook eyelet 324 of the hook 322 which is contained in the cavity 328 positioned at or towards the back end 316 of body 312. FIG. 19 illustrates the chambered fishing lure 310 in the deployed position in which hook 322 is released from the cavity 328, and positioned a fixed distance from the body 312. Placed on the outside surface of the body 312 is an external eyelet 348 for attachment of a main fishing line 350. The main fishing line 350 connects to the fishing reel (not illustrated). The chamber 342 may optionally contain a weighted object 352.

Figure 21A:
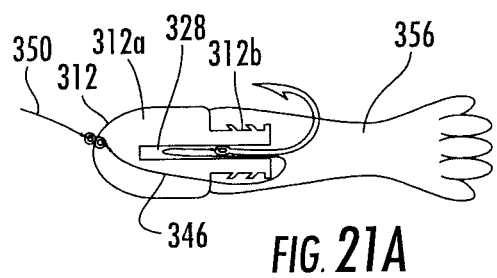
FIG. 21A is a longitudinal cross-section of the alternative embodiment of the fishing lure having a releasable hook illustrated in FIG. 20 having a shrimp tail attachment.
Figure 21B:
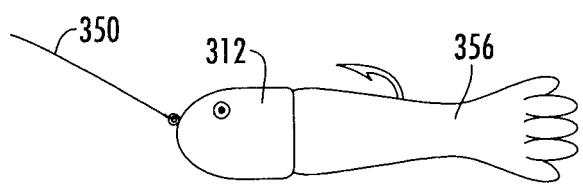
FIG. 21B is a side elevational view of the alternative embodiment of the fishing lure having a releasable hook illustrated in FIG. 21A, illustrated in the non-deployed state.
Figure 21C:
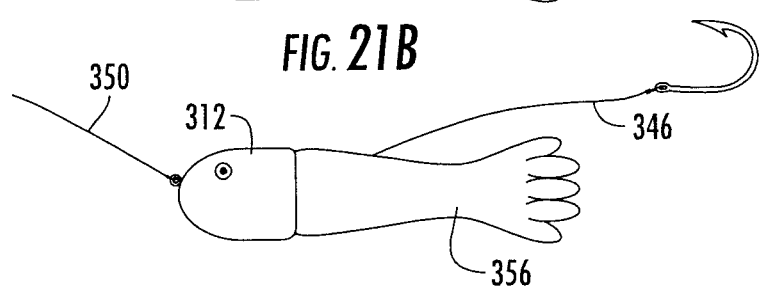
FIG. 21C is a side elevational view of the alternative embodiment of the fishing lure having a releasable hook illustrated in FIG. 21A, illustrated in the deployed state.
Figure 22A:
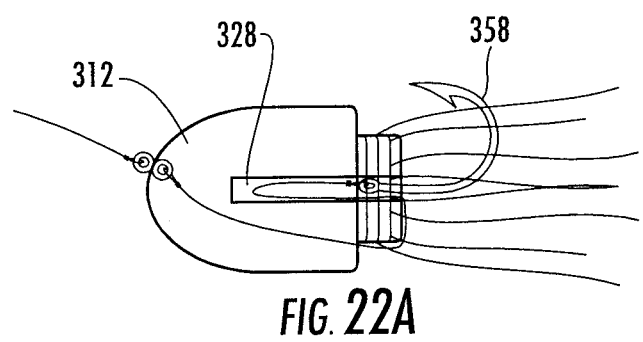
FIG. 22A is an alternative embodiment of the fishing lure of the instant invention having a releasable hook in the form of a jig with hair attachment, illustrated in the non-deployed state without the reloadable leader lure assembly.
Figure 22B:
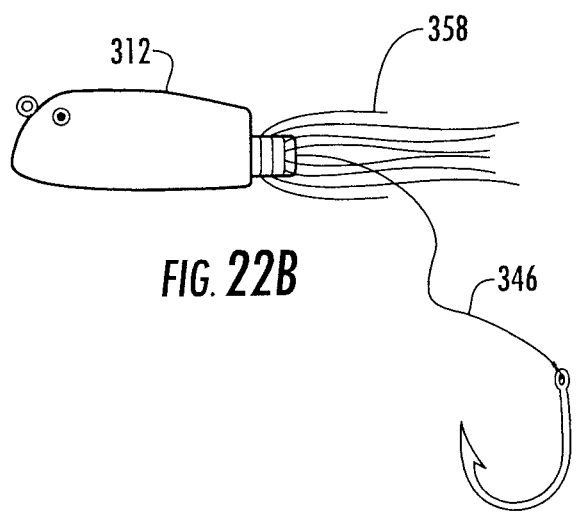
FIG. 22B is an alternative embodiment of the fishing lure of the instant invention having a releasable hook in the form of a jig with hair attachment, illustrated in the deployed state without the reloadable leader lure assembly.

The chambered fishing lure 310 may be constructed in many shapes and sizes depending on the aquatic environment, type of fish, or other fishing requirements. For example, FIG. 20A (non-deployed state) and FIG. 20B (deployed state) illustrate the chambered fishing lure 310 in the form of a jig. The main body 312 contains a generally rounded jig head portion 312a and a generally rectangular collar portion 312b with one or more barbs 354. Additionally, a portion of the leader line 346 is molded into the jig head 312a. FIGS. 21A-C illustrate an alternative embodiment of the chambered fishing lure 310 having a soft plastic shrimp tail attachment 356. FIGS. 22A (non-deployed state) and 22B (deployed state) illustrate the chambered fishing lure 310 in which the jig head contains hair 358 tied or attached to the collar.

Referring to FIGS. 23-29, an alternative embodiment of the reloadable leader assembly 400 of the fishing lure 310 in accordance with the instant invention is illustrated. Similar to the previously described embodiment 48, the reloadable leader assembly 400 is positionable within the body of the fishing lure to provide a releasable hook thereto. The reloadable leader assembly 400 has a first end 402 and a second end 404 and comprises support arms 406 and 408. The support arms 406 and 408 are arranged in a generally parallel manner. Mated or connected to, or integrally formed with the support arms 406 and 408 are side wall members 410 and 412. The side wall members 410 and 412 are arranged in a generally parallel manner and connect with the support arms in a generally perpendicular manner to form an enclosure area 414, see FIG. 27. The enclosure area 414 is sized and shaped to contain a rotatable member 416. Referring to FIG. 28A, the rotatable member 416, illustrated herein as a spool-like assemblage, contains a first circular member 418 and a second circular member 420. The first circular member 418 and the second circular member 420 are separated by a cylindrical, drum body 422. The cylindrical, drum body 422 contains an open lumen 424 (see FIG. 28B) that runs the entire length of the body and is constructed and arranged to receive a pivoting member 426 (see FIG. 28C). The pivoting member 426 contains a cylindrical body 428 which is sized and shaped to fit within the open lumen 424 of the cylindrical body 422. The top portion and/or the bottom portion may contain a cap member 430 which could be attached to the cylindrical body 428. Alternatively, the cap member 430 may be integrally formed to the cylindrical body 428. In either case, the cap member contains a rotation tool receiving area 432. The rotation tool receiving area 432 is constructed and arranged to receive a tool, such as tool 94, for providing rotation of the cylindrical drum body 422. The rotation tool receiving area 432 can be, for example, conjugately shaped to or have a complementary geometrical shape, i.e. cross shape associated with a Phillips screw head or a hex or square screw head, with the shape of the tool 94, such that insertion of the tool within provides a secure fit. Rotation of the cylindrical drum body 422 is rotated in a similar manner as described previously. When rotated, the pivoting member 426 provides a user the ability to rotate the drum in a clockwise/counterclockwise rotation, thereby winding or unwinding an attached leader line (not illustrated). Both of the circular members 418 and 420 contain an opening 434 which is sized and shaped to receive and hold the pivoting member 426. Additionally, each of the circular members 418 and 420 may contain one or more recessed or dimpled regions 436. The dimpled regions may be utilized to lock the spool member into a fixed position as desired for storage and/or transport. Alternatively, the dimples may cooperate with a spring loaded pin or ball to provide controlled resistance to pulling the leader from the spool.

Figures 27, 28A:
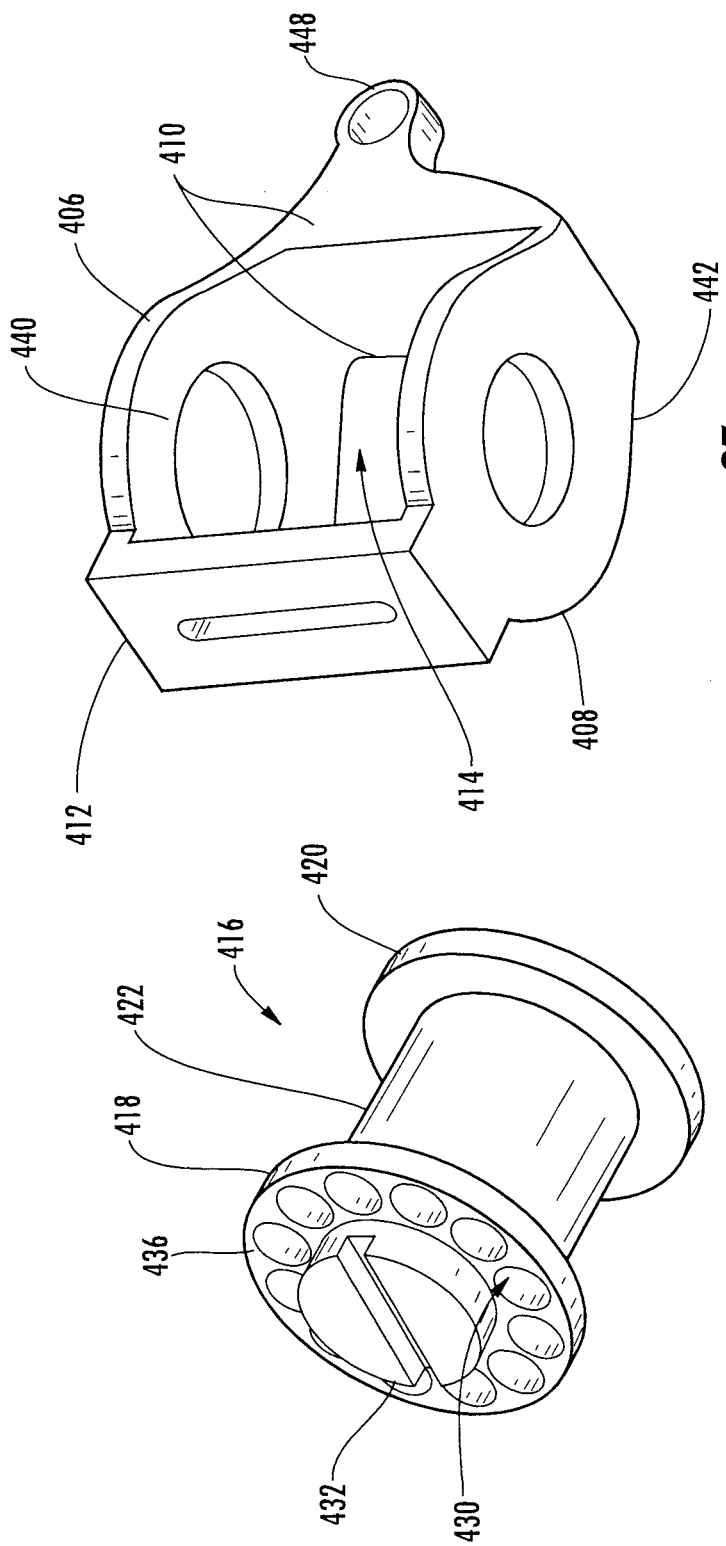
FIG. 27 is a perspective view of the support structure of the reloadable leader assembly illustrated in FIG. 23.
FIG. 28A is a perspective view of the spool assembly of the reloadable leader assembly illustrated in FIG. 23.
Figure 28B:
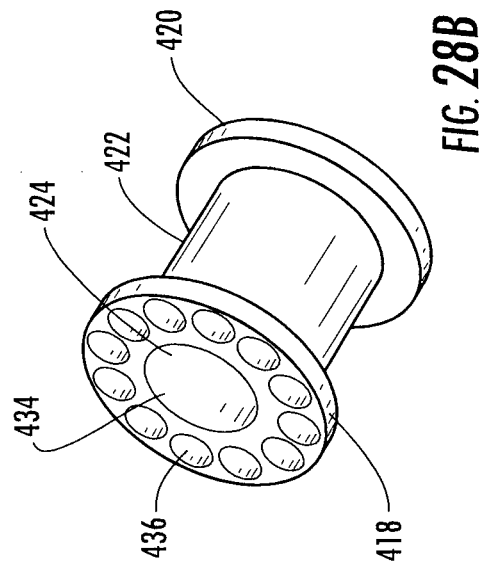
FIG. 28B is a perspective view of the spool assembly of the reloadable leader assembly illustrated in FIG. 23 without the rotational member.
Figure 28C:
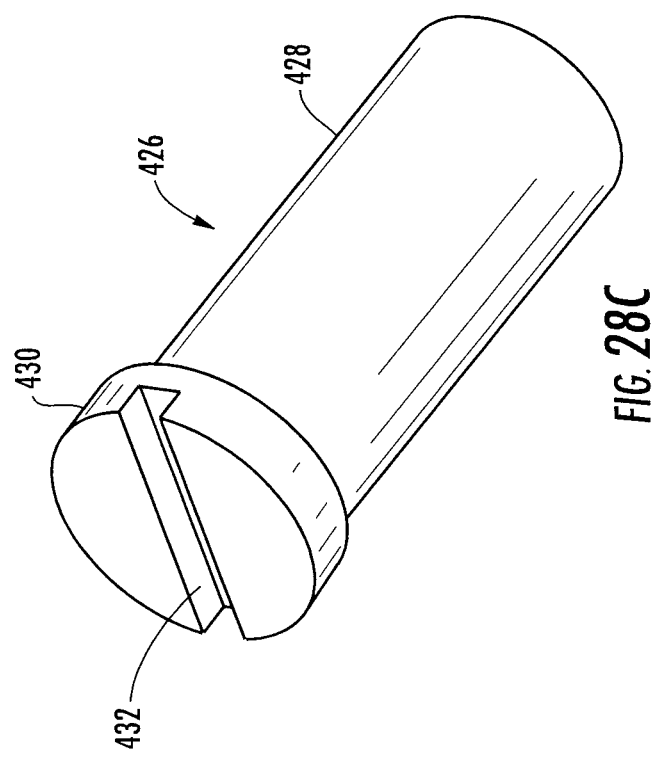
FIG. 28C is a perspective view of the rotational member of the spool assembly of the reloadable leader assembly illustrated in FIG. 23.
Figure 29:
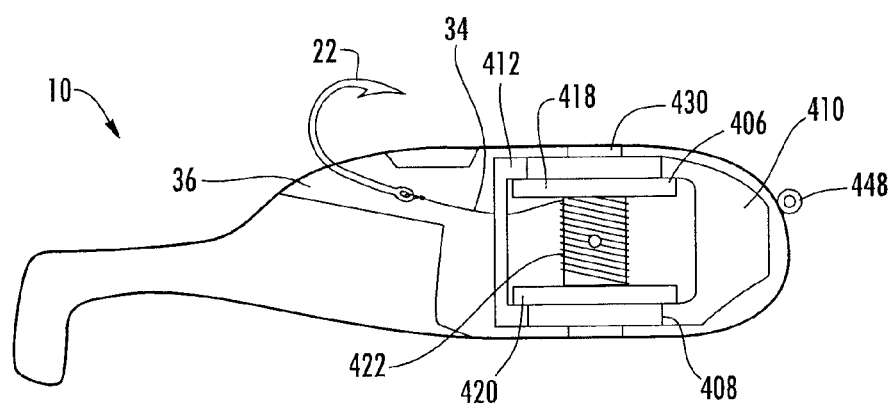
FIG. 29 is a cross-sectional view of the reloadable leader assembly illustrated in FIG. 23 positioned within the reloadable leader assembly chamber of the chambered fishing lure having a releasable hook illustrated in FIG. 1.

To assemble the reloadable leader lure assembly 400, the rotatable member 416 is placed within the enclosed area 414 such that the first circular member 418 is aligned with and contacts the support arm 406 and the second circular member 420 aligns with and contacts support arm 408. The openings 434 of the first and second circular members are aligned with openings 440 and 442 of the support arm 406 and support arm 408 respectively. Once in the proper alignment, the pivoting member 426 can be inserted within the openings, and placed within the open lumen 424 of the cylindrical body 422. As illustrated in FIG. 28A, the cap member 430 rests above the first cylindrical portion 418. The cylindrical drum 422 may contain an opening 444 (FIG. 24) for attachment of a leader line (not illustrated). The leader line may be wrapped around the drum and exit through a slot 446 located on side wall member 412. Attached to the side wall member 410 is an eyelet hook 448. The reloadable leader lure assembly 400 can be inserted within any of the embodiments of the chambered fishing lures as illustrated or contemplated and described herein. For example, FIG. 29 illustrates the reloadable leader lure assembly 400 positioned within the reloadable leader lure assembly chamber 36 of the chambered fishing lure 10 having a releasable hook 22 illustrated in FIG. 1.

Figure 30:
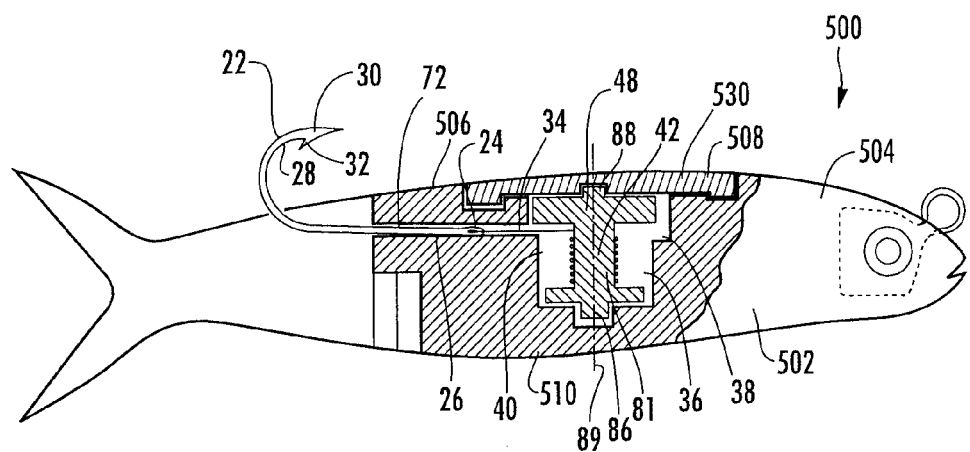
FIG. 30 is a side view partially in cross section illustrating an alternative embodiment of the instant invention.
Figure 31:
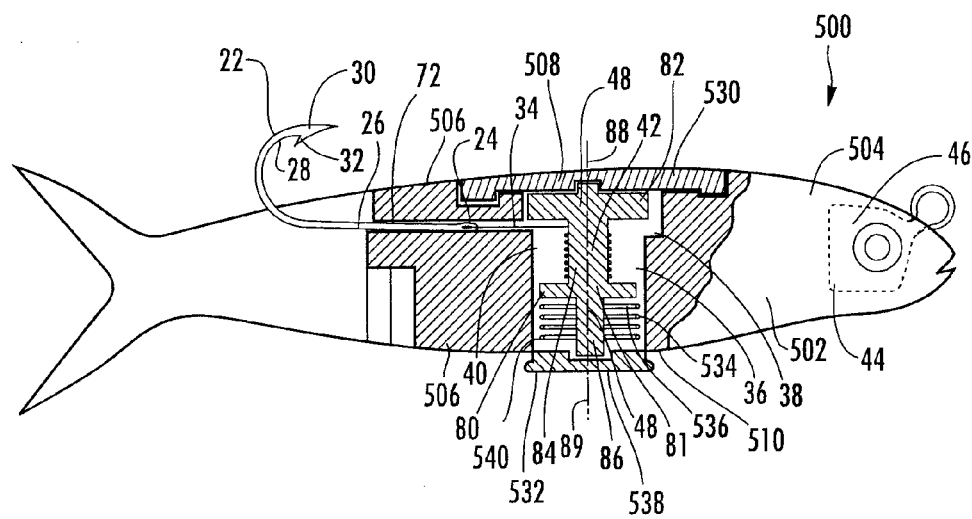
FIG. 31 is a side view partially in cross section illustrating an alternative embodiment of the instant invention.

Referring to FIGS. 30 and 31, alternative embodiments of the chambered fishing lure 500 are illustrated. With respect to FIG. 30, a side view of one embodiment of the chambered fishing lure 500 having a releasable hook 22 of the instant invention is illustrated. FIG. 31 illustrates a similar embodiment having the addition of a drag or clutch assembly ## that is constructed and arranged to allow additional control over the release of the leader from the lure. The chambered fishing lure 500 includes a body 502 having a front portion 504, a back portion 506, a top portion 508, and a bottom portion 510. The body 502 may be made of any material(s) commonly used in the manufacturing of fishing lures, but is preferably made of a polymeric material such as plastic. The body 502 may contain markings, colorations, or be shaped to resemble baitfish, mice, crayfish, insects, frogs, or other animals and/or objects that fish prey upon. Attached to the chambered fishing lure 500 is a releasable hook 22. As illustrated, the hook is arranged in the "non-deployed" position in which little or no leader line 34 is exposed. This is the typical starting position when the fisherman places the lure into the water.

In the deployed position, the leader 34 is extended so that the hook 22 is positioned at a predetermined distance away from the body 502. The deployed position typically results from a fish strike in which the fish actually bites at and contacts the lure. In this situation, the fish may realize that it has bitten something that it does not want to eat so that the lure is released but the hook is retained in its mouth. The hook is preferably a standard fishhook, having an eyelet 24, a shank 26, a bight portion 28, and a pointed terminal end 30 with or without a barb 32. The hook 22 may be coated with a protective coating to prolong the useful life of the hook by providing protection from the adverse effects of the environment, such as rusting, corroding, or other weathering. Coupling the hook 22 to the body 502 of the chambered fishing lure having 500 is a leader line 34, such as but not limited to a fluorocarbon leader line or a monofilament leader line, braided metal or polymeric material or suitable combinations thereof.

Positioned within the interior of the body 502 is a reloadable leader assembly chamber 36. The reloadable leader assembly chamber 36 may contain a first end 38 and a second end 40 connected by a mid portion 42. A second chamber 44 is constructed and arranged to hold a weighted object 46 diving blade or spoon (not shown) or the like. Alternatively, the weighted object 46 may be molded within the body at any suitable location for creating different action or movement to the lure when moved through the water. Placed within the reloadable leader lure assembly chamber 36 is a reloadable leader assembly, illustrated herein as a spool assembly 48. In general, the spool assembly is constructed and arranged to contain a predetermined length of leader line 34 in a coiled or otherwise controllably releasable configuration. The spool assembly also permits the leader line to be rewound or otherwise repositioned within the cavity of the lure for repeated deployments.

In this embodiment, the spool 81 includes a first circular flange member 80, a second circular flange member 82 and a drum 84. In a particularly preferred embodiment, one of the circular members 80, 82 is formed to have a sufficiently large diameter to extend at least partially through the outer contoured surface of the body to allow rotation thereof by hand without the need for tools, keys or the like. Attached to the first circular flange member 80 and the second circular flange member 82 is a pivot assembly, illustrated herein as spindles 86 and 88, respectively. The spindles 86 and 88 are coupled or integrally formed as part of the spool assembly in such a manner as to provide rotational movement of drum 84 about its longitudinal axis 89. Apertures or indentions are provided within the interior of the chamber for cooperating with the spindles. An access door 530 is provided to allow access to the spool assembly as needed or for assembly. The access door may be held in position by fastener, adhesive, living hinge or the like suitable for holding the access door in position during storage and use. While the pivot assembly is illustrated as appendages, the pivot assembly can contain other elements that produce rotational spin about an axis. For example, the pivot assembly could be a longitudinal member, such as an axle, fixed in position with a bearing or bushing inside an opening in the first and second circular members. Alternatively, the first and second circular members may be fixed to the axle, with bearings, bushings, magnets or the like provided at the connecting points where the axle is supported.

The pivot assembly may include additional mechanical means of generating rotation, such as the use of gears, ratchet and pawl systems or the like. It should also be noted that the spindles are illustrated as extending outwardly from the distal ends of the drum member, apertures or an inner bore may be provided within the drum and the spindles may be secured to the body of the lure without departing from the scope of the invention. Positioned at the back portion 506 of the body 502 is an aperture 72. The aperture 72 is sized and shaped to allow a hook, when inserted within the hollow interior of the body 502, to fit snuggly therein with the aperture 72 engaging opposing sides of the eye 24 and shank 26 of the hook, thereby preventing rotational movement while still allowing easy or controlled release thereof.

Referring to FIG. 31, an embodiment of the present invention including a drag or clutch assembly 532 is illustrated. The drag or clutch assembly is generally constructed and arranged to allow an operator to control the tension and/or release speed of the hook and leader from the lure. In a preferred embodiment, the drag assembly 532 is provided with at least one clutch disc 534 which is positioned between the spool assembly and a pressure plate 536. A thumbscrew 538 and an optional spring member 540 may be utilized to apply pressure and thus friction to the spool assembly to control the pressure required and/or the speed in which the leader and hook are available for extension from the lure. It should be noted that while the clutch and pressure plate are illustrated as flat disc shaped members, other shapes may be utilized without departing from the scope of the invention. It should also be noted that while a coil spring is illustrated, other types of spring members such as Belleville washers or the like may be utilized without departing from the scope of the invention.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A chambered fishing lure having a releasable leader and hook assembly comprising:
a body portion, said body portion having a main eyelet secured thereto for attachment to a fishing line, said body portion having an outer contoured shape constructed and arranged to appear as food to a fish, said body portion including an inner chamber containing a drum positioned for rotation about an axis therein, said drum sized for accepting a predetermined length of a leader line in a coiled configuration, said drum including a portion extending through said outer contoured shape which is constructed and arranged to allow rotation of said drum from outside said body portion, whereby said leader line may be recoiled around said drum, said leader line including a first end secured to said drum and a second end secured to an eyelet portion of a hook member, said body portion having an aperture extending from said inner chamber through said outer contoured shape, said aperture sized and shaped to allow said leader line to extend freely there through, said aperture sized and shaped to allow said eyelet portion and an adjacent shank portion of said hook member to slide at least partially there through, said aperture engaging opposing sides of said eyelet portion and said shank portion when said hook member is positioned therein to prevent substantial rotation of said hook member with respect to said body portion, said eyelet portion and said shank portion of said hook member releasably positionable within said aperture which is sized and shaped to frictionally engage said hook member when positioned therein to require a predetermined force to cause said second end of said leader line and said hook member to be released from said body portion upon a strike from a fish to allow the second end of said leader line and said hook member to extend a predetermined distance away from said body portion, a distance between said main eyelet and said drum remaining substantially constant.

2. The chambered fishing lure having a releasable leader and hook assembly of claim 1 wherein said drum includes a spindle positioned at each distal end thereof, said spindle positioned along said axis for rotation thereabout.

3. The chambered fishing lure having a releasable leader and hook assembly of claim 2 wherein said drum includes a flange on each distal end thereof, said flanges being larger in diameter than said drum.

4. The chambered fishing lure having a releasable leader and hook assembly of claim 2 wherein said portion of said drum extending through said outer contoured shape includes a key-slot, said key slot being constructed and arranged to cooperate with a tool for rotation of said drum from outside said body portion, whereby said leader line may be recoiled around said drum.

5. The chambered fishing lure having a releasable leader and hook assembly of claim 4 wherein said key-slot has the shape of a polygon, said tool having a substantially polygon shape for interlocking cooperation with said key-slot.

6. The chambered fishing lure having a releasable leader and hook assembly of claim 2 including a drag assembly, said drag assembly being constructed and arranged to provide predetermined resistance to deployment of said hook member and said second end of said leader line.

7. The chambered fishing lure having a releasable leader and hook assembly of claim 6 wherein said drag assembly frictionally engages said drum.

8. The chambered fishing lure having a releasable leader and hook assembly of claim 7 wherein said drag assembly includes at least one spring loaded member, said drum having a dimpled region, said at least one spring loaded member frictionally engaging said dimpled region.

9. The chambered fishing lure having a releasable leader and hook assembly of claim 8 wherein said frictional engagement between said drum and said at least one spring loaded member is manually adjustable.

10. The chambered fishing lure having a releasable leader and hook assembly of claim 7 wherein said drag assembly includes at least one clutch disc member and at least one pressure plate member, a first side of said at least one clutch disc member frictionally engaging said drum and a second side of said at least one clutch disc member frictionally engaging said at least one pressure plate member.

11. The chambered fishing lure having a releasable leader and hook assembly of claim 2, wherein said portion of said drum extending through said outer contoured shape includes a cap member, a portion of said cap member extending through said outer contoured shape, said cap member being constructed and arranged to allow rotation of said drum from outside said body portion, whereby said leader may be recoiled around said drum.

12. The chambered fishing lure having a releasable leader and hook assembly of claim 11, wherein said cap member is integrally formed as a portion of said drum.

13. The chambered fishing lure having a releasable leader and hook assembly of claim 1, wherein said chamber includes a spool assembly, said spool assembly having a first end and a second end, said spool assembly having a first and a second support arm, a first end of said first support arm connecting to a first end of said second support arm, a second end of said first support arm connected to a second end of said second support arm.

14. The chambered fishing lure having a releasable leader and hook assembly of claim 13, including an arm extending from the point of interconnection of the second end of said first support arm and said second end of said second support arm, said arm including said aperture sized and shaped to allow said hook member, when inserted within a hollow interior of the arm, to fit snugly therein, thereby preventing rotational movement while still allowing easy or controlled release thereof.

\* \* \* \* \*